(12) United States Patent
Coalter, III

(10) Patent No.: US 8,614,162 B2
(45) Date of Patent: Dec. 24, 2013

(54) CATALYST COMPOSITION WITH PHOSPHORUS-BASED DONOR AND METHOD

(71) Applicant: Dow Global Technologies LLC, Midland, MI (US)

(72) Inventor: Joseph N. Coalter, III, Katy, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 13/710,975

(22) Filed: Dec. 11, 2012

(65) Prior Publication Data

US 2013/0102457 A1    Apr. 25, 2013

Related U.S. Application Data

(62) Division of application No. 12/648,715, filed on Dec. 29, 2009, now abandoned.

(60) Provisional application No. 61/141,170, filed on Dec. 29, 2008.

(51) Int. Cl.
*B01J 31/00* (2006.01)
*C08F 4/44* (2006.01)
*C08F 4/06* (2006.01)
*C08F 4/00* (2006.01)

(52) U.S. Cl.
USPC ........... 502/162; 502/121; 502/123; 526/141; 526/145; 526/193

(58) Field of Classification Search
USPC ........... 502/121, 155, 162; 526/139, 145, 193
See application file for complete search history.

(56) References Cited

U.S. PATENT DOCUMENTS

| 3,328,375 | A | * | 6/1967 | Price | 526/128 |
| 3,558,586 | A | * | 1/1971 | Fodor | 526/139 |
| 4,229,318 | A | * | 10/1980 | Mueller-Tamm et al. | 502/105 |
| 4,495,338 | A | * | 1/1985 | Mayr et al. | 526/124.2 |

* cited by examiner

*Primary Examiner* — David W Wu
*Assistant Examiner* — Elizabeth Eng
(74) *Attorney, Agent, or Firm* — Whyte Hirschboeck Dudek S.C.

(57) ABSTRACT

Disclosed are catalyst compositions having an external electron donor which includes one or more of the following compositions: a phosphite, a phosphonite, a pyrophosphite, and/or a diphosphazane. Ziegler-Natta catalyst compositions containing the present external electron donor exhibit strong activity and produce propylene-based olefins with high isotacticity and high melt flow rate.

16 Claims, No Drawings

CATALYST COMPOSITION WITH PHOSPHORUS-BASED DONOR AND METHOD

CROSS REFERENCE TO RELATED APPLICATION

This application is a divisional application of U.S. application Ser. No. 12/648,715, filed on Dec. 29, 2009 which claims priority to U.S. provisional application Ser. No. 61/141,170 filed on Dec. 26, 2008, the entire content of which is incorporated by reference herein.

BACKGROUND

The present disclosure relates to catalyst compositions with an external electron donor comprising one or more of the following: a phosphite, a phosphonite, a pyrophosphite (diphosphite), and/or a diphosphazane (iminodiphosphite), and the resultant olefin-based polymers produced therefrom.

Known are Ziegler-Natta catalyst compositions for the production of olefin-based polymers. Ziegler-Natta catalyst compositions typically include a procatalyst containing a transition metal halide (i.e., titanium, chromium, vanadium), a cocatalyst such as an organoaluminum compound, and optionally an external electron donor and/or an activity limiting agent. The art presently recognizes a finite set of compounds suitable for use as external electron donors. With the continued diversification and sophistication of applications for olefin-based polymers, the art recognizes the need for olefin-based polymers with improved and varied properties. Desirable would be external electron donors for Ziegler-Natta catalyst compositions that contribute to strong catalyst activity and high hydrogen response during polymerization. Further desired are external electron donors for Ziegler-Natta catalysts that produce propylene-based polymers with high isotacticity, high melt flow rate, and low toxicity.

SUMMARY

The present disclosure is directed to catalyst compositions with an external electron donor which includes one or more of the following: a phosphite, a phosphonite, a pyrophosphite, and/or a diphosphazane. The external electron donors of the present disclosure exhibit high compatability with Ziegler-Nata procatalyst compositions and contribute to high catalyst activity and high hydrogen response when combined with these procatalysts. In addition, the present external electron donors produce olefin-based polymers with high isotacticity and high melt flow rate when used in conjunction with Ziegler-Natta procatalyst compositions.

In an embodiment, a catalyst composition is provided. The catalyst composition includes a procatalyst composition, cocatalyst, and an external electron donor. The procatalyst composition includes a magnesium moiety. The external electron donor includes a phosphite and optionally an alkoxysilane. The catalyst composition may optionally include an activity limiting agent.

In an embodiment, the procatalyst composition includes a combination of the magnesium moiety, a titanium moiety, and/or an internal electron donor.

In an embodiment, the internal electron donor of the procatalyst composition may be an aromatic acid ester, a diether, a silyl ester and combinations thereof.

In an embodiment, the external electron donor includes a phosphite of the structure (VI) as provided below.

$R_1$, $R_2$, and $R_3$ of structure (VI) are the same or different. Each of $R_1$-$R_3$ is selected from a substituted hydrocarbyl group having 1 to 20 carbon atoms, an unsubstituted hydrocarbyl group having 1 to 20 carbon atoms, and combinations thereof. In another embodiment, $R_1$-$R_3$ are the same or different, and each of $R_1$-$R_3$ is selected from a $C_1$-$C_6$ alkyl group. In a further embodiment, at least two R groups of $R_1$-$R_3$ are members of a P-ring structure.

Another catalyst composition is provided in the present disclosure. In an embodiment, a catalyst composition is provided which includes a procatalyst composition, cocatalyst, and an external electron donor. The procatalyst composition includes a magnesium moiety. The external electron donor includes a phosphonite (or related compound) and optionally an alkoxysilane. The catalyst composition may optionally include an activity limiting agent.

In an embodiment, the external electron donor includes a phosphonite of the structure (IX) as provided below.

$R_1$ and $R_2$ are the same or different. Each of $R_1$ and $R_2$ is selected from a hydrocarbyl group having 1 to 20 carbon atoms, a substituted hydrocarbyl group having 1 to 20 carbon atoms, and combinations thereof. X is selected from a hydrocarbyl group having 1 to 20 carbon atoms, a substituted hydrocarbyl group having 1 to 20 carbon atoms, a substituted amino group, an unsubstituted amino group a halide, a pseudohalide, and a hydroxyl group.

In an embodiment, any of $R_1$, $R_2$ and/or X is a member of a P-ring structure.

Another catalyst composition is provided in the present disclosure. In an embodiment, a catalyst composition is provided which includes a procatalyst composition, cocatalyst, and an external electron donor. The procatalyst composition includes a magnesium moiety. The external electron donor includes a pyrophosphite and optionally an alkoxysilane. The catalyst composition may optionally include an activity limiting agent.

In an embodiment, the external electron donor includes a pyrophosphite of the structure (XI) as provided below.

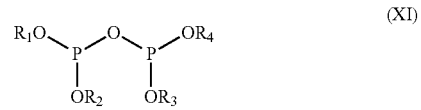

$R_1$, $R_2$, $R_3$ and $R_4$ are the same or different. Each of $R_1$-$R_4$ is selected from a substituted hydrocarbyl group having 1 to 20 carbon atoms, an unsubstituted hydrocarbyl group having 1 to 20 carbon atoms, and combinations thereof. In an embodiment, any R group of $R_1$-$R_4$ may be a member of a P-ring structure.

Another catalyst composition is provided in the present disclosure. In an embodiment, a catalyst composition is provided which includes a procatalyst composition, cocatalyst, and an external electron donor. The external electron donor includes a diphosphazane and optionally an alkoxysilane. The catalyst composition may optionally include an activity limiting agent.

In an embodiment, the external electron donor includes a diphosphazane of the structure (XII) as provided below.

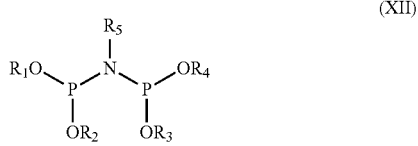

$R_1$, $R_2$, $R_3$, $R_4$ and $R_5$ are the same or different. Each of $R_1$-$R_5$ is selected from a substituted hydrocarbyl group having 1 to 20 carbon atoms, an unsubstituted hydrocarbyl group having 1 to 20 carbon atoms, and combinations thereof. In an embodiment, at least one R group of $R_1$-$R_5$ may be a member of a P-ring structure.

A polymerization process is provided in the present disclosure. In an embodiment, the polymerization process includes contacting, under polymerization conditions, an olefin with a catalyst composition. The catalyst composition may be any of the foregoing catalyst compositions. The catalyst composition contains an external electron donor comprising one or more of the following: a phosphite, a phosphonite, a pyrophosphite, a diphosphazane, and any combination thereof. The catalyst composition may optionally include an alkoxysilane and/or an activity limiting agent. The process includes forming an olefin-based polymer.

In an embodiment, the olefin is propylene. The process includes forming a propylene-based polymer having a melt flow rate from about 0.01 g/10 min to about 2000 g/10 min.

In an embodiment, the olefin is propylene. The process includes forming a propylene-based polymer having a xylene solubles content from about 0.5% to about 10%.

An advantage of the present disclosure is the provision of an improved external electron donor.

An advantage of the present disclosure is the provision of an improved catalyst composition for the polymerization of olefin-based polymers.

An advantage of the present disclosure is the provision of an improved Ziegler-Natta catalyst composition.

An advantage of the present disclosure is a catalyst composition with an external electron donor that contains a phosphite, and/or a phosphonite, and/or a pyrophosphite, and/or a diphosphazane, the catalyst composition exhibiting improved activity and/or improved hydrogen response during polymerization.

An advantage of the present disclosure is a catalyst composition with an external electron donor that contains a phosphite, and/or a phosphonite, and/or a pyrophosphite, and/or a diphosphazane, the catalyst composition producing olefin-based polymers with high isotacticity and/or high melt flow rate.

DETAILED DESCRIPTION

In an embodiment, a catalyst composition is provided. As used herein, "a catalyst composition" is a composition that forms an olefin-based polymer when contacted with an olefin under polymerization conditions. The catalyst composition includes a procatalyst composition, a cocatalyst, and an external electron donor. The external electron donor comprises a phosphite. The catalyst composition may optionally include an activity limiting agent.

The procatalyst composition may include (i) magnesium; (ii) a transition metal compound of an element from Periodic Table groups IV to VIII; (iii) a halide, an oxyhalide, and/or an alkoxide of (i) and/or (ii); (iv) an internal electron donor; and (v) combinations of (i), (ii), (iii), and (iv). Nonlimiting examples of suitable procatalyst components include halides, oxyhalides, and alkoxides of magnesium, titanium, vanadium, chromium, molybdenum, zirconium, hafnium, and combinations thereof.

In an embodiment, the procatalyst composition includes a magnesium moiety. Nonlimiting examples of suitable magnesium moieties include anhydrous magnesium chloride and/or its alcohol adduct, magnesium alkoxide or aryloxide, mixed magnesium alkoxy halide, and/or carboxylated magnesium dialkoxide or aryloxide. In another embodiment, the magnesium moiety is a magnesium di-($C_{1-4}$)alkoxide, such as diethoxymagnesium. In another embodiment, the magnesium moiety is magnesium chloride.

In an embodiment, the procatalyst composition includes a titanium moiety. Nonlimiting examples of suitable titanium moieties include titanium alkoxides, titanium aryloxides, titanium alkoxy halides, and titanium halides. In a further embodiment, the titanium moiety is titanium tetrachloride.

The procatalyst composition also includes an internal electron donor. As used herein, an "internal electron donor" is a compound added during formation of the procatalyst composition that donates a pair of electrons to one or more metals present in the resultant procatalyst composition. Not bounded by any particular theory, it is believed that the internal electron donor assists in regulating the formation of active sites thereby enhancing catalyst stereoselectivity.

In an embodiment, the procatalyst composition is produced by way of halogenation which converts a procatalyst precursor and the internal electron donor into a combination or a complex of a magnesium moiety and a titanium moiety into which the internal electron donor is incorporated. The magnesium moiety and the titanium moiety may be any respective magnesium or titanium moiety as disclosed herein.

In an embodiment, the internal electron donor is an aromatic acid ester, a diether, a silyl ester, and combinations thereof.

In an embodiment, the internal electron donor is an aromatic acid ester. As used herein, an "aromatic acid ester" is a monocarboxylic acid ester or a polycarboxylic acid ester that includes structure (I) as follows:

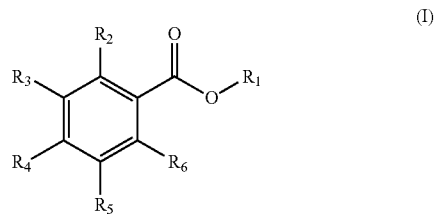

wherein $R_1$ is selected from a hydrocarbyl having 1 to 10 carbon atoms, a substituted hydrocarbyl having 1 to 10 carbon atoms, a alkoxycarbonyl group, and a heteroatom or heteroatom-containing group. As used herein, the term "hydrocarbyl" and "hydrocarbon" refer to substituents containing only hydrogen and carbon atoms, including branched or unbranched, saturated or unsaturated, cyclic, polycyclic or acyclic species, and combinations thereof. Nonlimiting examples of hydrocarbyl groups include alkyl-, cycloalkyl-, alkenyl-, alkadienyl-, cycloalkenyl-, cycloalkadienyl-, aryl-, aralkyl, alkylaryl, and alkynyl-groups.

As used herein, the terms "substituted hydrocarbyl" and "substituted hydrocarbon" refer to a hydrocarbyl group that is substituted with one or more nonhydrocarbyl substituent groups. A nonlimiting example of a nonhydrocarbyl substituent group is a heteroatom. As used herein, a "heteroatom" refers to an atom other than carbon or hydrogen. The heteroatom can be a non-carbon atom from Groups IV, V, VI, and VII of the Periodic Table. Nonlimiting examples of heteroatoms include: F, Cl, Br, N, O, P, B, S, and Si. As used herein, the term "halohydrocarbyl" refers to a hydrocarbyl that is substituted with one or more halogen atoms.

In an embodiment, the hydrocarbyl group of $R_1$ of structure (I) can include a substituted- or unsubstituted-hydrocarbyl group having 1 to 10 carbon atoms.

$R_2$-$R_6$ of the aromatic acid ester of structure (I) are the same or different, each being selected from hydrogen, a hydrocarbyl group having 1 to 10 carbon atoms, a substituted hydrocarbyl group having 1 to 10 atoms, a carboxylate having 1 to 10 carbon atoms, a heteroatom, and combinations thereof.

In an embodiment, the aromatic acid ester is a benzoic acid ester. As used herein, "benzoic acid ester" is a monocarboxylic acid ester with the structure (II) below:

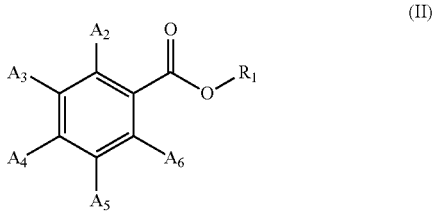

(II)

wherein $R_1$ is the same as $R_1$ of structure (I). $A_2$-$A_6$ are the same or different and each is selected from hydrogen, a hydrocarbyl group having 1 to 10 carbon atoms, a substituted hydrocarbyl group having 1 to 10 atoms, a heteroatom, and combinations thereof. Nonlimiting examples of suitable benzoic acid esters include an alkyl p-alkoxybenzoate (such as ethyl p-methoxybenzoate, methyl p-ethoxybenzoate, ethyl p-ethoxybenzoate), an alkyl benzoate (such as ethyl benzoate, methyl benzoate), an alkyl p-halobenzoate (ethyl p-chlorobenzoate, ethyl p-bromobenzoate), a benzoyl halide (such as benzoyl chloride), and benzoic anhydride. In an embodiment, the benzoic acid ester is selected from ethyl benzoate, benzoyl chloride, ethyl p-bromobenzoate, n-propyl benzoate, and benzoic anhydride. In another embodiment, the benzoic acid ester is ethyl benzoate.

In an embodiment, the aromatic acid ester is a phthalic acid ester. As used herein, a "phthalic acid ester" refers to a polycarboxylic acid ester with the structure (III) below.

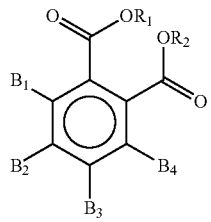

(III)

wherein $R_1$ and $R_2$ are the same or different and each is selected from a hydrocarbyl having 1 to 10 carbon atoms and a substituted hydrocarbyl group having 1 to 10 carbon atoms. $B_1$-$B_4$ are the same or different and each is selected from hydrogen, a hydrocarbyl group having 1 to 10 carbon atoms, a substituted hydrocarbyl group having 1 to 10 atoms, a heteroatom, and combinations thereof. Nonlimiting examples of suitable phthalic acid esters include dimethyl phthalate, diethyl phthalate, di-n-propyl phthalate, diisopropyl phthalate, di-n-butyl phthalate, diisobutyl phthalate, di-tert-butyl phthalate, diisoamyl phthalate, di-tert-amyl phthalate, dineopentyl phthalate, di-2-ethylhexyl phthalate, di-2-ethyldecyl phthalate, bis(2,2,2-trifluoroethyl) phthalate, diisobutyl 4-t-butylphthalate, and diisobutyl 4-chlorophthalate. In an embodiment, the phthalic acid ester is diisobutyl phthalate.

In an embodiment, the aromatic acid ester includes acyl halides or anhydrides. Not wishing to be bound by any particular theory, it is believed that the acyl halides and/or anhydrides react with the ethoxide species in the procatalyst precursor to form the corresponding ethyl esters. In an embodiment, benzoyl chloride is used alone or in combination with ethyl benzoate. In another embodiment, phthaloyl chloride and/or phthalic anhydride is used to replace phthalate.

In an embodiment, the internal electron donor is a di-ether. The di-ether may be a dialkyl di-ether compound represented by the structure (IV).

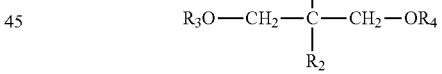

(IV)

wherein $R_1$ to $R_4$ are independently of one another an alkyl, aryl or aralkyl group having up to 20 carbon atoms, which may optionally contain a group 14, 15, 16, or 17 heteroatom, provided that $R_1$ and $R_2$ may be a hydrogen atom. The dialkylether may be linear or branched, and may include one or more of the following groups: alkyl, cycloaliphatic, aryl, alkylaryl or arylalkyl radicals with 1-18 carbon atoms, and hydrogen. Nonlimiting examples of suitable dialkyl diether compounds include dimethyl diether, diethyl diether, dibutyl diether, methyl ethyl diether, methyl butyl diether, methyl cyclohexyl diether, 2,2-dimethyl-1,3-dimethoxypropane, 2,2-diethyl-1,3-dimethoxypropane, 2,2-di-n-butyl-1,3-dimethoxypropane, 2,2-diiso-butyl-1,3-dimethoxypropane, 2-ethyl-2-n-butyl-1,3-dimethoxypropane, 2-n-propyl-2-cyclopentyl-1,3-dimethoxypropane, 2,2-dimethyl-1,3-diethoxypropane, 2-n-propyl-2-cyclohexyl-1,3-diethoxypropane, 2-(2-ethylhexyl)-1,3-dimethoxypropane, 2-isopropyl-1,3-dimethoxypropane, 2-n-butyl-1,3-dimethoxypropane, 2-sec-butyl-1,3-dimethoxypropane, 2-cyclohexyl-1,3-dimethoxypropane, 2-phenyl-1,3-diethoxypropane, 2-cumyl-1,3-diethoxypropane, 2-(2-phenylethyl)-1,3-dimethoxypropane, 2-(2-cyclohexylethyl)-1,3-dimethoxypropane, 2-(p-chlorophenyl)-1,3-dimethoxypropane, 2-(diphenylmethyl)-1,3-dimethoxypropane, 2-(1-naphthyl)-1,3-dimethoxypropane, 2-(fluorophenyl)-1,3-dimethoxypropane, 2-(1-decahydronaphthyl)-1,3-dimethoxypropane, 2-(p-t-butylphenyl)-1,3-dimethoxypropane, 2,2-dicyclohexyl-1,3-dimethoxypropane, 2,2-di-n-propyl-1,3-dimethoxypropane, 2-methyl-2-n-propyl-1,3-dimethoxypropane, 2-methyl-2-benzyl-1,3-dimethoxypropane, 2-methyl-2-ethyl-1,3-dimethoxypropane, 2-methyl-2-phenyl-1,3-dimethoxypropane, 2-methyl-2-cyclohexyl-1,3-dimethoxypropane, 2,2-bis(p-chlorophenyl)-1,3-dimethoxypropane, 2,2-bis(2-cyclohexylethyl)-1,3-dimethoxypropane, 2-methyl-2-isobutyl-1,3-dimethoxypropane, 2-methyl-2-(2-ethylhexyl)-1,3-dimethoxy propane, 2-methyl-2-isopropyl-1,3-dimethoxypropane, 2,2-diphenyl-1,3-dimethoxypropane, 2,2-dibenzyl-1,3-dimethoxypropane, 2,2-bis(cyclohexylmethyl)-1,3-dimethoxypropane, 2,2-diisobutyl-1,3-diethoxypropane, 2,2-diisobutyl-1,3-di-n-butoxypropane, 2-isobutyl-2-isopropyl-1,3-dimethoxypropane, 2,2-di-sec-butyl-1,3-dimethoxypropane, 2,2-di-t-butyl-1,3-dimethoxypropane, 2,2-dineopentyl-1,3-dimethoxypropane, 2-isopropyl-2-isopentyl-1,3-dimethoxypropane, 2-phenyl-2-benzyl-1,3-dimethoxypropane, 2-cyclohexyl-2-cyclohexylmethyl-1,3-dimethoxypropane, 2-isopropyl-2-(3,7-dimethyloctyl)1,3-dimethoxypropane, 2,2-diisopropyl-1,3-dimethoxypropane, 2-isopropyl-2-cyclohexylmethyl-1,3-dimethoxypropane, 2,2-diisopentyl-1,3-dimethoxypropane, 2-isopropyl-2-cyclohexyl-1,3-dimethoxypropane, 2-isopropyl-2-cyclopentyl-1,3-dimethoxypropane, 2,2-dicylopentyl-1,3-dimethoxypropane, 2-n-heptyl-2-n-pentyl-1,3-dimethoxypropane, 9,9-bis(methoxymethyl)fluorene, 1,3-dicyclohexyl-2,2-bis(methoxymethyl)propane, 3,3-bis(methoxymethyl)-2,5-dimethylhexane, or any combination of the foregoing. In an embodiment, the internal electron donor is 1,3-dicyclohexyl-2,2-bis(methoxymethyl)propane, 3,3-bis(methoxymethyl)-2,5-dimethylhexane, 2,2-dicyclopentyl-1,3-dimethoxypropane and combinations thereof.

In an embodiment, the internal electron donor may include a silyl ester. In one embodiment, the silyl ester can be any silyl ester as disclosed in co-pending U.S. Patent Application Ser. No. 61/117,820 filed on Nov. 25, 2008, the entire content of which is incorporated by reference herein.

In an embodiment, the silyl ester has the structure (V) as shown below.

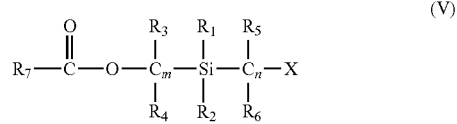

(V)

The letters "m" and "n" are each an integer from 1 to 5, m and n being the same or different, m and n each denoting the number of carbon atoms in the respective carbon chain. It is understood that each additional carbon in the $C_m$ carbon chain and/or the $C_n$ carbon chain can include one or more R' substituent(s). The R' substituent(s) can be hydrogen or a substituted/unsubstituted hydrocarbyl group having 1 to 20 carbon atoms.

The substituents $R_1$, $R_2$, $R_3$, $R_4$, $R_5$, $R_6$ and $R_7$ of structure (V) can be the same or different. Each of $R_1$-$R_7$ is selected from hydrogen, a substituted hydrocarbyl group having 1 to 20 carbon atoms, an unsubstituted hydrocarbyl group having 1 to 20 carbon atoms, and combinations thereof.

The symbol "X" of structure (V) represents an electron donating group. The term "electron donating group" refers to a functional group that donates one or more electron pairs to the procatalyst precursor. The electron pair is typically donated during procatalyst formation, such as during halogenation, for example. Nonlimiting examples of suitable electron donating groups include —C(=O)OR, —O(O=)CR, —(O=)CNHR, —(O=)CNRR', —NH(O=)CR, —NR'(O=)CR, —C(=O)R, —OR, —NHR, —NR'R, —SR, S(=O)R, —S(=O)$_2$R, —OS(=O)$_2$(OR), and combinations thereof. R and R' of electron donating group X can be a substituted or an unsubstituted hydrocarbyl group having 1 to 20 carbon atoms.

In an embodiment, the internal electron donor may be a mixed internal electron donor as disclosed in co-pending U.S. Patent Application Ser. No. 61/117,763 filed on Nov. 25, 2008, the entire content of which is incorporated by reference herein.

In an embodiment, the procatalyst composition includes a combination of a magnesium moiety, a titanium moiety, and one or more internal electron donors. The magnesium moiety, the titanium moiety, and the internal electron donor(s) may be any respective composition as disclosed herein.

In an embodiment, the procatalyst composition is a mixed magnesium/titanium compound ("MagTi") complexed with the internal electron donor. The "MagTi compound" has the formula $Mg_dTi(OR^e)_fX_g$(IED) wherein $R^e$ is an aliphatic or aromatic hydrocarbon radical having 1 to 14 carbon atoms or COR' wherein R' is an aliphatic or aromatic hydrocarbon radical having 1 to 14 carbon atoms; each $OR^e$ group is the same or different; X is independently chlorine, bromine or iodine, preferably chlorine; d is 0.5 to 56, or 2 to 4; f is 2 to 116 or 5-15; and g is 0.5 to 116, or 1 to 3. The term "IED" refers to the internal electron donor. The internal electron donor may be any internal electron donor disclosed herein. Nonlimiting examples of MagTi compounds include procatalysts under the trade name SHAC, available from The Dow Chemical Company, Midland, Mich.

In an embodiment, the procatalyst composition has a titanium content of from about 0.1 percent by weight to about 6.0 percent by weight, based on the total solids weight, or from about 1.0 percent by weight to about 4.5 percent by weight, or from about 1.5 percent by weight to about 3.5 percent by weight. The weight ratio of titanium to magnesium in the solid procatalyst composition is suitably between about 1:3 and about 1:160, or between about 1:4 and about 1:50, or between about 1:6 and about 1:30. Weight percent is based on the total weight of the procatalyst composition.

In an embodiment, the magnesium to internal electron donor molar ratio is from about 100:1 to about 1:1, or from about 30:1 to about 2:1, or from about 15:1 to about 3:1. Weight percent is based on the total weight of the procatalyst composition.

In another embodiment, the procatalyst composition includes a magnesium chloride support upon which a titanium chloride is deposited and into which the internal electron donor is incorporated.

Ethoxide content in the procatalyst composition indicates the completeness of conversion of precursor metal ethoxide into a metal halide. The internal electron donor assists in converting ethoxide into halide during halogenation. In an embodiment, the procatalyst composition includes from about 0.01 wt % to about 1.0 wt %, or from about 0.05 wt % to about 0.5 wt % ethoxide. Weight percent is based on the total weight of the procatalyst composition.

In an embodiment, the internal electron donor is free of phosphorous atom(s) or is otherwise void of phosphorus atom(s). In another embodiment, the procatalyst composition is free of phosphorus atom(s) or is otherwise void of phosphorus atoms.

The present catalyst composition includes a cocatalyst. As used herein, a "cocatalyst" is a substance capable of converting the procatalyst to an active polymerization catalyst. The cocatalyst may include hydrides, alkyls, or aryls of aluminum, lithium, zinc, tin, cadmium, beryllium, magnesium, and combinations thereof. In an embodiment, the cocatalyst is a hydrocarbyl aluminum cocatalyst represented by the formula $R_3Al$ wherein each R is an alkyl, cycloalkyl, aryl, or hydride radical; at least one R is a hydrocarbyl radical; two or three R radicals can be joined in a cyclic radical forming a heterocyclic structure; each R can be the same or different; and each R, which is a hydrocarbyl radical, has 1 to 20 carbon atoms, and preferably 1 to 10 carbon atoms. In a further embodiment, each alkyl radical can be straight or branched chain and such hydrocarbyl radical can be a mixed radical, i.e., the radical can contain alkyl, aryl, and/or cycloalkyl groups. Nonlimiting examples of suitable radicals are: methyl, ethyl, propyl, isopropyl, butyl, isobutyl, tert-butyl, pentyl, neopentyl, hexyl, 2-methylpentyl, heptyl, octyl, isooctyl, 2-ethylhexyl, 5,5-dimethylhexyl, nonyl, decyl, isodecyl, undecyl, dodecyl, phenyl, phenethyl, methoxyphenyl, benzyl, tolyl, xylyl, naphthyl, naphthal, methylnapthyl, cyclohexyl, cycloheptyl, and cyclooctyl.

Nonlimiting examples of suitable hydrocarbyl aluminum compounds are as follows: triisobutylaluminum, trihexylaluminum, di-isobutylaluminum hydride, dihexylaluminum hydride, isobutylaluminum dihydride, hexylaluminum dihydride, di-isobutylhexylaluminum, isobutyl dihexylaluminum, trimethylaluminum, triethylaluminum, tripropylaluminum, triisopropylaluminum, tri-n-butylaluminum, trioctylaluminum, tridecylaluminum, tridodecylaluminum, tribenzylaluminum, triphenylaluminum, trinaphthylaluminum, and tritolylaluminum. In an embodiment, the cocatalyst is selected from triethylaluminum, triisobutylaluminum, trihexylaluminum, di-isobutylaluminum hydride, and dihexylaluminum hydride.

In an embodiment, the cocatalyst is a hydrocarbyl aluminum compound represented by the formula $R_nAlX_{3-n}$ wherein n=1 or 2, R is an alkyl, and X is a halide or alkoxide. Nonlimiting examples of suitable compounds are as follows: methylaluminoxane, isobutylaluminoxane, diethylaluminum ethoxide, diisobutylaluminum chloride, tetraethyldialuminoxane, tetraisobutyldialuminoxane, diethylaluminum chloride, ethylaluminum dichloride, methylaluminum dichloride, and dimethylaluminum chloride.

In an embodiment, the cocatalyst is triethylaluminum. The molar ratio of aluminum to titanium is from about 5:1 to about 500:1, or from about 10:1 to about 200:1, or from about 15:1 to about 150:1, or from about 20:1 to about 100:1. In another embodiment, the molar ratio of aluminum to titanium is about 45:1.

The present catalyst composition includes an external electron donor. As used herein, an "external electron donor" is a compound added independent of procatalyst formation and contains at least one functional group that is capable of donating a pair of electrons to a metal atom. In an embodiment, the external electron donor includes a phosphorus-based compound. As used herein, a "phosphorus-based" compound is a compound which includes one or more phosphorus atom(s) and excludes compounds with a phosphoryl group (P=O), with exception to tautomers disclosed herein. In an embodiment, the phosphorus-based compound includes one or more of the following: a phosphite, a phosphonite, a pyrophosphite, a phosphazane, and a diphosphazane. Bounded by no particular theory, it is believed that the present phosphorus-based external electron donor enhances hydrogen response and/or catalyst stereoselectivity, (i.e., increases polymer melt flow at a given hydrogen/monomer ratio and/or reduces xylene soluble material in the format polymer).

In an embodiment, the external electron donor includes a phosphite. The phosphite has the structure (VI):

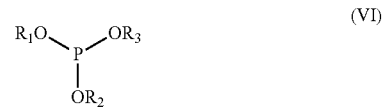

(VI)

wherein $R_1$, $R_2$, and $R_3$ are the same or different. Each of $R_1$-$R_3$ is selected from a substituted hydrocarbyl group having 1 to 20 carbon atoms, an unsubstituted hydrocarbyl group having 1 to 20 carbon atoms, and combinations thereof.

In an embodiment, $R_1$-$R_3$ of structure (VI) are the same or different, and each of $R_1$-$R_3$ is selected from a $C_1$-$C_6$ alkyl group, and combinations thereof.

In an embodiment, $R_1$-$R_3$ of structure (VI) are the same or different and each of $R_1$-$R_3$ is selected from a methyl group, an ethyl group, a propyl group, an isopropyl group, a butyl group, an isobutyl group, a $C_5$ ring structure, a $C_6$ ring structure, and combinations thereof. As used herein, a "$C_5$ ring structure" is a cyclic structure containing five carbon atoms. A "$C_6$ ring structure" is a cyclic structure containing six carbon atoms. A ring structure may be aromatic or may be non-aromatic. A ring structure may be mono-cyclic or polycyclic and may be a hydrocarbyl or may include a heteroatom. A nonlimiting example of a $C_5$ ring structure is a cyclopentyl group. Nonlimiting examples of a $C_6$ ring structure include a cyclohexyl group or a phenyl group. A nonlimiting example of a polycyclic ring structure is a fluorene-based compound.

In an embodiment, each of $R_1$-$R_2$ of structure (VI) is a methyl group and $R_3$ is selected from a methyl group, an ethyl group, a propyl group, an isopropyl group, a butyl group, an isobutyl group, a $C_5$ ring structure, and a $C_6$ ring structure.

In an embodiment, each of $R_1$-$R_2$ of structure (VI) is an ethyl group and $R_3$ is selected from a methyl group, an ethyl group, a propyl group, an isopropyl group, a butyl group, an isobutyl group, a $C_5$ ring structure, a $C_6$ ring structure, and a poly-cyclic ring structure that is a fluorene-based compound.

In an embodiment, each of $R_1$-$R_2$ of structure (VI) is an ethyl group and $R_3$ of structure (VI) is a methyl group.

In an embodiment, each of $R_1$-$R_2$ of structure (VI) is an ethyl group and $R_3$ is a propyl group.

In an embodiment, each of $R_1$-$R_3$ of structure (VI) is an butyl group.

In an embodiment, each of $R_1$-$R_3$ of structure (VI) is an ethyl group.

In an embodiment, at least one, or at least two R groups of $R_1$-$R_3$ are members of a P-ring structure. As used herein, a "P-ring structure" is a ring structure which includes at least one P—O linkage. The P-ring structure may be a monocyclic structure or a polycyclic structure. The P-ring structure may or may not be aromatic. Nonlimiting examples of suitable members for the P-ring structure include the following atoms: C, O, P, N, and S. In an embodiment, the P-ring structure includes from 5 to 8 members. In an further embodiment, each of $R_1$-$R_3$ are members of a P-ring structure.

Nonlimiting examples of suitable P-ring structures for structure (VI) are set forth in Table A below.

TABLE A

| Structure | Name |
|---|---|
| (structure) | 2-ethoxy-1,3,2-dioxaphospholane |
| (structure) | 2-ethoxy-1,3,2-dioxaphosphinane |
| (structure) | 2-ethoxy-1,3,2-dioxaphosphepane |

In an embodiment, the external electron donor may be complexed in whole or in part with the cocatalyst.

In an embodiment, the external electron donor includes a phosphite and one or more alkoxysilanes. The phosphite can be any phosphite as disclosed herein. The alkoxysilane has the general formula: $SiR_m(OR')_{4-m}$ (I) where R independently each occurrence is hydrogen or a hydrocarbyl or an amino group optionally substituted with one or more substituents containing one or more Group 14, 15, 16, or 17 heteroatoms, said R containing up to 20 atoms not counting hydrogen and halogen; R' is a $C_{1-20}$ alkyl group; and m is 0, 1, 2 or 3. In an embodiment, R is $C_{6-12}$ aryl, alkyl or aralkyl, $C_{3-12}$ cycloalkyl, $C_{3-12}$ branched alkyl, or $C_{3-12}$ cyclic or acyclic amino group, R' is $C_{1-4}$ alkyl, and m is 1 or 2. Nonlimiting examples of suitable silane compositions include dicyclopentyldimethoxysilane, di-tert-butyldimethoxysilane, methylcyclohexyldimethoxysilane, methylcyclohexyldiethoxysilane, ethylcyclohexyldimethoxysilane, diphenyldimethoxysilane, diisopropyldimethoxysilane, di-n-propyldimethoxysilane, diisobutyldimethoxysilane, diisobutyldiethoxysilane, di-n-butyldimethoxysilane, cyclopentyltrimethoxysilane, isopropyltrimethoxysilane, n-propyltrimethoxysilane, n-propyltriethoxysilane, ethyltriethoxysilane, tetramethoxysilane, tetraethoxysilane, diethylaminotriethoxysilane, cyclopentylpyrrolidinodimethoxysilane, bis(pyrrolidino)dimethoxysilane, bis(perhydroisoquinolino)dimethoxysilane, and dimethyldimethoxysilane. In an embodiment, the alkoxysilane is dicyclopentyldimethoxysilane, methylcyclohexyldimethoxysilane, n-propyltrimethoxysilane, and any combination of thereof. In another embodiment, the alkoxysilane is dicyclopentyldimethoxysilane.

In an embodiment, the external electron donor may include from about 0.1 mol % to about 99.9% mol % phosphite and from about 99.9 mol % to about 0.1 mol % alkoxysilane.

In an embodiment, the catalyst composition includes an activity limiting agent (ALA). As used herein, an "activity limiting agent" ("ALA") is a material that reduces catalyst activity at elevated temperature (i.e., temperature greater than about 85° C.). An ALA inhibits or otherwise prevents polymerization reactor upset and ensures continuity of the polymerization process. Typically, the activity of Ziegler-Natta catalysts increases as the reactor temperature rises. Ziegler-Natta catalysts also typically maintain high activity near the melting point temperature of the polymer produced. The heat generated by the exothermic polymerization reaction may cause polymer particles to form agglomerates and may ultimately lead to disruption of continuity for the polymer production process. The ALA reduces catalyst activity at elevated temperature, thereby preventing reactor upset, reducing (or preventing) particle agglomeration, and ensuring continuity of the polymerization process.

The activity limiting agent may be a carboxylic acid ester, a diether, a diol ester, and combinations thereof. The carboxylic acid ester can be an aliphatic or aromatic, mono- or polycarboxylic acid ester. Nonlimiting examples of suitable polycarboxylic acid esters include dimethyl phthalate, diethyl phthalate, di-n-propyl phthalate, diisopropyl phthalate, di-n-butyl phthalate, diisobutyl phthalate, di-tert-butyl phthalate, diisoamyl phthalate, di-tert-amyl phthalate, dineopentyl phthalate, di-2-ethylhexyl phthalate, and di-2-ethyldecyl phthalate.

The aliphatic carboxylic acid ester may be a $C_4$-$C_{30}$ aliphatic acid ester, may be a mono- or a poly-(two or more) ester, may be straight chain or branched, may be saturated or unsaturated, and any combination thereof. The $C_4$-$C_{30}$ aliphatic acid ester may also be substituted with one or more Group 14, 15 or 16 heteroatom containing substituents. Nonlimiting examples of suitable $C_4$-$C_{30}$ aliphatic acid esters include $C_{1-20}$ alkyl esters of aliphatic $C_{4-30}$ monocarboxylic acids, $C_{1-20}$ alkyl esters of aliphatic $C_{8-20}$ monocarboxylic acids, $C_{1-4}$ alkyl mono- and diesters of aliphatic $C_{4-20}$ monocarboxylic acids and dicarboxylic acids, $C_{1-4}$ alkyl esters of aliphatic $C_{8-20}$ monocarboxylic acids and dicarboxylic acids, and $C_{4-20}$ mono- or polycarboxylate derivatives of $C_{2-100}$ (poly)glycols or $C_{2-100}$ (poly)glycol ethers. In a further embodiment, the $C_4$-$C_{30}$ aliphatic acid ester may be isopropyl myristate, di-n-butyl sebacate, (poly)(alkylene glycol) mono- or diacetates, (poly)(alkylene glycol) mono- or di-myristates, (poly)(alkylene glycol) mono- or di-laurates, (poly)(alkylene glycol) mono- or di-oleates, glyceryl tri(acetate), glyceryl tri-ester of $C_{2-40}$ aliphatic carboxylic acids, and mixtures thereof. In a further embodiment, the $C_4$-$C_{30}$ aliphatic ester is isopropyl myristate or di-n-butyl sebacate.

In an embodiment, the activity limiting agent includes a diether. The diether can be any di-ether represented by the structure (IV) as previously disclosed.

In an embodiment, the activity limiting agent includes a succinate composition having the following structure (VII):

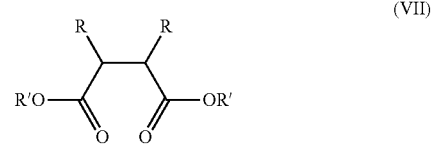

(VII)

wherein R and R' may be the same or different, R and/or R' including one or more of the following groups: linear or branched alkyl, alkenyl, cycloalkyl, aryl, arylalkyl or alkylaryl group, optionally containing heteroatoms. One or more ring structures can be formed via one or both 2- and 3-position carbon atom.

In an embodiment, the activity limiting agent includes a diol ester as represented by the following structure (VIII):

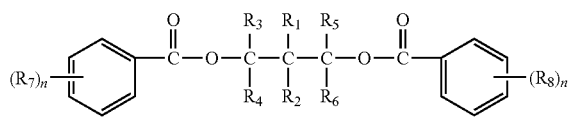

(VIII)

wherein n is an integer from 1 to 5. $R_1$ and $R_2$, may be the same or different, and each may be selected from hydrogen, methyl, ethyl, n-propyl, i-propyl, n-butyl, i-butyl, t-butyl, allyl, phenyl, or halophenyl group. $R_3$, $R_4$, $R_5$, $R_6$, $R_7$, and $R_8$, may be the same or different, and each may be selected from hydrogen, halogen, substituted, or unsubstituted hydrocarbyl having 1 to 20 carbon atoms. $R_1$-$R_6$ groups may optionally contain one or more heteroatoms replacing carbon, hydrogen or both, the hetero-atom selected from nitrogen, oxygen, sulfur, silicon, phosphorus and a halogen. $R_7$ and $R_8$, may be the same or different, and may be bonded to any carbon atom of the 2-, 3-, 4-, 5-, and 6-position of either phenyl ring.

In an embodiment, the external electron donor and the activity limiting agent can be added into the polymerization reactor separately. In another embodiment, the external electron donor and the activity limiting agent can be mixed together in advance and then added into the polymerization reactor as a mixture. In the mixture, more than one external electron donor or more than one activity limiting agent can be used.

In an embodiment, the catalyst composition includes any of the foregoing phosphites in combination with any of the foregoing alkoxysilanes and/or any of the foregoing activity limiting agents. Any of the present catalyst compositions may comprise two or more embodiments disclosed herein.

The present disclosure provides another catalyst composition. In an embodiment, a catalyst composition is provided which includes a procatalyst composition, a cocatalyst, and an external electron donor. The procatalyst includes a magnesium moiety. The procatalyst composition and the cocatalyst may be any respective procatalyst composition and cocatalyst as disclosed herein. The external electron donor comprises a phosphonite. The procatalyst composition and the cocatalyst may be any respective procatalyst composition and cocatalyst as disclosed herein. The catalyst composition may optionally include an alkoxysilane and/or an ALA. The alkoxysilane and/or the ALA may be any respective alkoxysilane and/or ALA as disclosed herein.

In an embodiment, the phosphonite has the structure (IX):

(IX)

wherein $R_1$ and $R_2$ are the same or different. Each of $R_1$ and $R_2$ is selected from a hydrocarbyl group having 1 to 20 carbon atoms, a substituted hydrocarbyl group having 1 to 20 carbon atoms.

The term X represents a group selected from a hydrocarbyl group having 1 to 20 carbon atoms, a substituted hydrocarbyl group having 1 to 20 carbon atoms, a substituted amino group, an unsubstituted amino group, a halide, a pseudohalide, or a hydroxyl group (—OH). As used herein, a "pseudohalide" refers to two or more atoms bounded together that resemble a halide in charge and reactivity. Nonlimiting examples of suitable pseudohalides include azides, isocyanates, isocyanides, carboxylates, sulfonates, phosphinates, and phosphates.

As used herein, an "amino group" refers to a nitrogen-containing compound derived from ammonia, a primary amine, or a secondary amine, with respective zero, one, or two, substituted (or unsubstituted) hydrocarbonyl groups having 1 to 20 carbons atoms. Nonlimiting examples of suitable amino groups include —$NH_2$, —$NHR_3$, or —$NR_3R_4$, wherein $R_3$ and $R_4$ are substituted (or unsubstituted) hydrocarbonyl groups having 1 to 20 carbons atoms. In an embodiment, $R_3$ and $R_4$ may be joined together or otherwise linked to form a ring structure. In a further embodiment, $R_3$ and/or $R_4$ may be joined together or otherwise linked with $R_1$ and/or $R_2$ of structure (IX) to form a ring structure. In an embodiment, X is a secondary amino group, and the structure (IX) is a phosphoramidite.

In an embodiment, X is a hydroxyl group (—OH). When X is a hydroxyl group, the structure (IX) is a tautomer. A "tautomer," as used herein, is a compound that is in chemical equilibrium between two interconvertible structures resulting from the migration of a hydrogen atom. Thus, when X is a hydroxyl group, structure (IX) is a tautomer as depicted by the equilibrium (X) below:

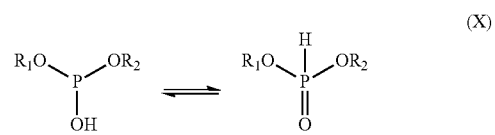

(X)

In an embodiment, any of $R_1$, $R_2$ and X, or at least two of $R_1$, $R_2$ and X, may be joined or otherwise linked together to form a P-ring structure. In an embodiment, the P-ring structure includes from 5 to 8 members. In an further embodiment, each of $R_1$, $R_2$ and X are members of a P-ring structure.

Nonlimiting examples of suitable P-ring structures for structure (IX) are set forth in Table B below.

TABLE B

| Structure | Name |
|---|---|
| | 2-methyl-1,3,2-dioxaphospholane |
| | N,N-dimethyl-1,3,2-dioxaphospholan-2-amine |
| | 2-ethoxy-1,2-oxaphosphinane |
| | 2-ethoxy-3-methyl-1,3,2-oxazaphospholidine |

In an embodiment, $R_1$ and $R_2$ of structure (IX) are the same or different. X is a hydrocarbyl group. Each of $R_1$, $R_2$, and X is selected from a $C_1$-$C_6$ alkyl group, and combinations thereof.

In an embodiment, $R_1$ and $R_2$ of structure (IX) are the same or different. X is a hydrocarbyl group. Each of $R_1$, $R_2$, and X is selected from a methyl group, an ethyl group, a propyl group, an isopropyl group, a butyl group, an isobutyl group, a $C_5$ ring structure, a $C_6$ ring structure, and combinations thereof.

In an embodiment, each of $R_1$ and $R_2$ of structure (IX) is a methyl group. X is selected from a halide or a hydrocarbyl group. The hydrocarbyl group is a $C_1$-$C_6$ alkyl group. The $C_1$-$C_6$ alkyl group is selected from a methyl group, an ethyl group, a propyl group, an isopropyl group, a butyl group, an isobutyl group, a $C_5$ ring structure, a $C_6$ ring structure. In another embodiment, X is chloride.

In an embodiment, each of $R_1$ and $R_2$ of structure (IX) is an ethyl group. X is selected from a halide or a hydrocarbyl group. The hydrocarbyl group is a $C_1$-$C_6$ alkyl group. The $C_1$-$C_6$ alkyl group is selected from a methyl group, an ethyl group, a propyl group, an isopropyl group, a butyl group, an isobutyl group, a $C_5$ ring structure, a $C_6$ ring structure. In a further embodiment, X is chloride.

In an embodiment, each of $R_1$ and $R_2$ of structure (IX) is an ethyl group. X is a hydrocarbyl group that is a methyl group.

In an embodiment, the external electron donor may be complexed in whole or in part with the cocatalyst.

In an embodiment, the external electron donor includes a phosphonite and an alkoxysilane. The alkoxysilane may be any alkoxysilane as disclosed herein. In a further embodiment, the external electron donor may include from about 0.1 mol % to about 99.9% mol % phosphonite and from about 99.9 mol % to about 0.1 mol % alkoxysilane. In a further embodiment, the catalyst composition includes an ALA.

In an embodiment, the external electron donor includes a phosphite and a phosphonite. The phosphite may be any phosphite as disclosed herein. The phosphonite may be any phosphonite as disclosed herein. The external electron donor may contain from about 0.1 mol % to about 99.9 mol % of the phosphite and from about 99.9 mol % to about 0.1 mol % of the phosphonite. In an further embodiment, the external donor includes a phosphite, a phosphonite, and an alkoxysilane. In yet a further embodiment, the catalyst composition includes and ALA.

The present disclosure provides another catalyst composition. In an embodiment, a catalyst composition is provided which includes a procatalyst composition, a cocatalyst, and an external electron donor. The procatalyst composition includes a magnesium moiety. The external electron donor comprises a pyrophosphite. The external electron donor may optionally include an alkoxysilane as discussed herein. The catalyst composition may optionally include an activity limiting agent as previously disclosed herein.

The procatalyst composition may be any procatalyst composition as disclosed herein. The cocatalyst may be any cocatalyst as disclosed herein.

The catalyst composition includes an external electron donor that comprises a pyrophosphite. The pyrophosphite has the structure (XI):

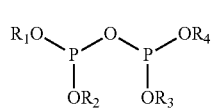

wherein $R_1$, $R_2$, $R_3$ and $R_4$ are the same or different and each is selected from a substituted hydrocarbyl group having 1 to 20 carbon atoms, an unsubstituted hydrocarbyl group having 1 to 20 carbon atoms, and combinations thereof.

In an embodiment, $R_1$-$R_4$ are the same or different. Each of $R_1$-$R_4$ of structure (XI) is selected from a $C_1$-$C_6$ alkyl group, and combinations thereof.

In an embodiment, $R_1$-$R_4$ of structure (XI) are the same or different. Each of $R_1$-$R_4$ is selected from a methyl group, an ethyl group, a propyl group, an isopropyl group, a butyl group, an isobutyl group, a $C_5$ ring structure, a $C_6$ ring structure, and combinations thereof.

In an embodiment, each of $R_1$-$R_4$ of structure (XI) is a methyl group.

In an embodiment, each of $R_1$-$R_4$ of structure (XI) is an ethyl group.

In an embodiment, each of $R_1$-$R_4$ of structure (XI) is a butyl group.

In an embodiment, at least one R group, or at least two R groups of $R_1$-$R_4$ are members of a P-ring structure. In an embodiment, the P-ring structure includes from 5 to 8 members. In an further embodiment, each of $R_1$-$R_4$ are members of a P-ring structure.

Nonlimiting examples of suitable P-ring structures for structure (XI) are set forth in Table C below.

TABLE C

| Structure | Name |
|---|---|
| 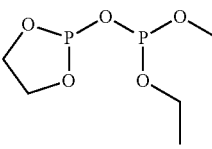 | 1,3,2-dioxaphospholan-2-yl diethyl phosphite |
| 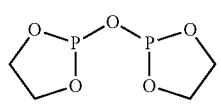 [SMILES: C1COP(OP2OCCO2)O1] | 2,2'-oxybis(1,3,2-dioxaphospholane) |
| 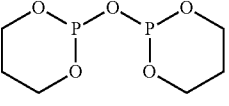 [SMILES: C1COP(OP2OCCCO2)OC1] | 2,2'-oxybis(1,3,2-dioxaphosphinane) |

In an embodiment, the external electron donor includes a pyrophosphite and an alkoxysilane. The alkoxysilane may be any alkoxysilane as disclosed herein. In a further embodiment, the external electron donor may include from about 0.1 mol % to about 99.9% mol % pyrophosphite and from about 99.9 mol % to about 0.1 mol % alkoxysilane.

In an embodiment, the external electron donor includes the pyrophosphite in combination with a phosphite and/or a phosphonite. The phosphite may be any phosphite disclosed herein. The phosphonite may be any phosphonite as disclosed herein. The external electron donor may contain from about 0.1 mol % to about 99.9 mol % of the phosphonite, from about 0.1 mol % to about 99.9 mol % of the phosphonite, and from about 99.9 mol % to about 0.1 mol % of the pyrophosphite. In an further embodiment, the external donor includes a pyrophosphite, a phosphite and/or a phosphonite, and an alkoxysilane. In another embodiment, the catalyst composition includes an ALA.

The present disclosure provides another catalyst composition. In an embodiment, a catalyst composition is provided which includes a procatalyst composition, a cocatalyst, and an external electron donor. The external electron donor comprises a diphosphazane. The external electron donor may optionally include an alkoxysilane and/or an ALA as disclosed herein.

The procatalyst composition may be any procatalyst composition disclosed herein. The cocatalyst may be any cocatalyst disclosed herein. In an embodiment, the procatalyst composition includes a magnesium moiety.

The catalyst composition includes an external electron donor that comprises a diphosphazane. The diphosphazane has the structure (XII):

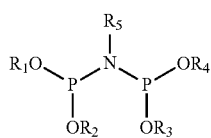

(XII)

wherein $R_1$, $R_2$, $R_3$, $R_4$ and $R_5$ are the same or different. Each of $R_1$-$R_5$ is selected from a substituted hydrocarbyl group having 1 to 20 carbon atoms, an unsubstituted hydrocarbyl group having 1 to 20 carbon atoms, and combinations thereof.

In an embodiment, $R_1$-$R_5$ are the same or different. Each of $R_1$-$R_5$ of structure (XII) is selected from a $C_1$-$C_6$ alkyl group, and combinations thereof. In a further embodiment, each of $R_1$-$R_5$ is selected from a methyl group, an ethyl group, a propyl group, an isopropyl group, a butyl group, an isobutyl group, a $C_5$ ring structure, a $C_6$ ring structure, and combinations thereof.

In an embodiment, each of $R_1$-$R_4$ of structure (XII) is an ethyl group. $R_5$ is selected from a methyl group, an ethyl group, a propyl group, an isopropyl group, a butyl group, an isobutyl group, a $C_5$ ring structure, and a $C_6$ ring structure.

In an embodiment, each of $R_1$-$R_4$ of structure (XII) is an ethyl group and $R_5$ of structure (XII) is an isopropyl group.

In an embodiment, at least one R group of $R_1$-$R_5$ is a member of a P-ring structure. In one embodiment, the P-ring structure includes a P—O linkage and a P—N linkage. In another embodiment, the P-ring structure includes from 5 to 8 members.

In an embodiment, at least two R groups of $R_1$-$R_5$ are members of one or more P-ring structures. Any two R groups of $R_1$-$R_5$ may be members of the same P-ring structure. Any two R groups of $R_1$-$R_5$ may be members of two distinct P-ring structures. In an embodiment, each of $R_1$-$R_5$ is a member of a P-ring structure.

Nonlimiting examples of suitable P-ring structures for structure (XII) are set forth in Table D below.

TABLE D

| Structure | Name |
|---|---|
|  | Diethyl 1,3,2-dioxaphospholan-2-yl(methyl)phosphoramidite |

TABLE D-continued

| Structure | Name |
|---|---|
|  | Diethyl 2-ethoxy-1,3,2-oxazaphosphinan-3-ylphosphonite |
|  | 3-(1,3,2-dioxaphospholan-2-yl)-2-ethoxy-1,3,2-oxazaphosphinane |
|  | N-(1,3,2-dioxaphospholan-2-yl)-N-methyl-1,3,2-dioxaphosinan-2-amine |

In an embodiment, the external electron donor includes a diphosphazane and an alkoxysilane. The alkoxysilane may be any alkoxysilane as disclosed herein. In a further embodiment, the external electron donor may include from about 0.1 mol % to about 99.9% mol % diphosphazane and from about 99.9 mol % to about 0.1 mol % alkoxysilane. In another embodiment, the catalyst composition includes as ALA.

In an embodiment, the external electron donor includes diphosphazane in combination with a phosphite and/or a phosphonite, and/or a pyrophosphonite. The phosphite, phosphonite, and pyrophosphonite may be any respective phosphite, phosphonite, or pyrophosphonite as disclosed herein. The external electron donor may contain from about 0.1 mol % to about 99.9 mol % of the diphosphazene and from about 99.9 mol % to about 0.1 mol % of the phosphite, and/or the phosphonite, and/or the pyrophosphonite. In an further embodiment, the external donor includes alkoxysilane. In another embodiment, the catalyst composition includes an ALA.

In an embodiment, a catalyst composition is provided which includes an external electron donor that includes a mixture of two or more of the following: phosphite, phosphonite, pyrophosphite, and diphosphazane. In one embodiment, the external electron donor is a mixture of any two (binary) of the foregoing compositions. In another embodiment, the external electron donor is a mixture of any three of the foregoing compositions. In another embodiment, the external electron donor is a mixture of all four of the foregoing compositions. In another embodiment, the catalyst composition containing any of the foregoing external electron donor mixtures may include an alkoxysilane and/or an ALA.

In an embodiment, a process for producing an olefin-based polymer is provided. The process includes contacting an olefin with a catalyst composition under polymerization conditions. The catalyst composition may be any catalyst composition as disclosed herein. The process further includes forming an olefin-based polymer.

In an embodiment, the catalyst composition includes an external electron donor composed of one or more of the following: a phosphite, a phosphonite, a pyrophosphite, and/ or a diphosphazane. The catalyst composition may optionally include an alkoxysilane and/or an activity limiting agent as previously disclosed.

As used herein, "polymerization conditions" are temperature and pressure parameters within a polymerization reactor suitable for promoting polymerization between the catalyst composition and an olefin to form the desired polymer. The polymerization process may be a gas phase, a slurry, or a bulk polymerization process, operating in one, or more than one, reactor.

One or more olefin monomers can be introduced in a polymerization reactor to react with the catalyst composition and to form an olefin-based polymer (or a fluidized bed of polymer particles). Nonlimiting examples of suitable olefin monomers include ethylene, propylene, $C_{4-20}$ α-olefins, such as 1-butene, 1-pentene, 1-hexene, 4-methyl-1-pentene, 1-heptene, 1-octene, 1-decene, 1-dodecene and the like; $C_{4-20}$ diolefins, such as 1,3-butadiene, 1,3-pentadiene, norbornadiene, 5-ethylidene-2-norbornene (ENB) and dicyclopentadiene; $C_{8-40}$ vinyl aromatic compounds including styrene, o-, m-, and p-methylstyrene, divinylbenzene, vinylbiphenyl, vinylnapthalene; and halogen-substituted $C_{8-40}$ vinyl aromatic compounds such as chlorostyrene and fluorostyrene.

In an embodiment, the olefin-based polymer can be a propylene-based olefin, an ethylene-based olefin, and combinations thereof. In an embodiment, the olefin-based polymer is a propylene-based polymer.

In an embodiment, polymerization occurs by way of gas phase polymerization. As used herein, "gas phase polymerization" is the passage of an ascending fluidizing medium, the fluidizing medium containing one or more monomers, in the presence of a catalyst through a fluidized bed of polymer particles maintained in a fluidized state by the fluidizing medium. "Fluidization," "fluidized," or "fluidizing" is a gas-solid contacting process in which a bed of finely divided polymer particles is lifted and agitated by a rising stream of gas. Fluidization occurs in a bed of particulates when an upward flow of fluid through the interstices of the bed of particles attains a pressure differential and frictional resistance increment exceeding particulate weight. Thus, a "fluidized bed" is a plurality of polymer particles suspended in a fluidized state by a stream of a fluidizing medium. A "fluidizing medium" is one or more olefin gases, optionally a carrier gas (such as $H_2$ or $N_2$) and optionally a liquid (such as a hydrocarbon) which ascends through the gas-phase reactor.

A typical gas-phase polymerization reactor (or gas phase reactor) includes a vessel (i.e., the reactor), the fluidized bed, a distribution plate, inlet and outlet piping, a compressor, a cycle gas cooler or heat exchanger, and a product discharge system. The vessel includes a reaction zone and a velocity reduction zone, each of which is located above the distribution plate. The bed is located in the reaction zone. In an embodiment, the fluidizing medium includes propylene gas and at least one other gas such as an olefin and/or a carrier gas such as hydrogen or nitrogen.

In an embodiment, the contacting occurs by way of feeding the catalyst composition into the polymerization reactor and introducing the olefin into the polymerization reactor. In an embodiment, the process includes contacting the olefin with a cocatalyst. The cocatalyst can be mixed with the procatalyst composition (pre-mix) prior to the introduction of the procatalyst composition into the polymerization reactor. In another embodiment, cocatalyst is added to the polymerization reactor independently of the procatalyst composition. The independent introduction of the cocatalyst into the polymerization reactor can occur simultaneously, or substantially simultaneously, with the procatalyst composition feed.

In an embodiment, the process includes mixing the external electron donor (and optionally the activity limiting agent) with the procatalyst composition. The external electron donor can be complexed with the cocatalyst and mixed with the procatalyst composition (pre-mix) prior to contact between the catalyst composition and the olefin. In another embodiment, the external electron donor and/or the activity limiting agent can be added independently to the polymerization reactor. In an embodiment, the procatalyst composition, the cocatalyst, and the external electron donor are mixed or otherwise combined prior to addition to the polymerization reactor.

In an embodiment, a polypropylene homopolymer is produced in a first reactor. The content of the first reactor is subsequently transferred to a second reactor into which ethylene (and optionally propylene) is introduced. This results in production of a propylene-ethylene copolymer in the second reactor.

In an embodiment, a polypropylene homopolymer is formed via introduction of propylene and any of the present procatalyst compositions, cocatalysts, external electron donors, and activity limiting agents in the first reactor. The polypropylene homopolymer is introduced into the second reactor along with ethylene (and optionally propylene) and an external electron donor and optionally an activity limiting agent. The external electron donor and the activity limiting agent may be the same as or different from the respective components used in the first reactor. This produces a propylene-ethylene copolymer (i.e., an impact copolymer) in the second reactor.

In an embodiment, the olefin is propylene. The process includes forming a propylene-based polymer having a melt flow rate (MFR) from about 0.01 g/10 min to about 2000 g/10 min, or from about 0.01 g/10 min to about 1000 g/10 min, or from about 0.1 g/10 min to about 500 g/10 min, or from about 0.5 g/10 min to about 150 g/10 min, or from about 1 g/10 min to about 100 g/10 min. In a further embodiment, the propylene-based polymer is a polypropylene homopolymer.

In an embodiment, the olefin is propylene. The process includes forming a propylene-based polymer having a xylene solubles content from about 0.5% to about 10%, or from about 1% to about 8%, or from about 1% to about 5%. In a further embodiment, the propylene-based polymer is a polypropylene homopolymer.

In an embodiment, the olefin is propylene. The process includes forming a propylene-based polymer at production rate from about 5 kg/g/hr to about 50 kg/g/hr, or from about 10 kg/g/hr to about 40 kg/g/hr. As used herein "production rate" refers to the kilograms of polymer produced per gram of catalyst composition consumed in the polymerization reactor per hour.

The present polymerization process may comprise two or more embodiments disclosed herein.

The effectiveness of an external electron donor depends largely on its compatibility with the procatalyst composition with which it is used. Not bounded by any particular theory, electrical and/or steric compatibility between certain external electron donors and particular procatalysts exists that yields better results than with the same procatalyst and less compatible external electron donors. This compatibility is unpredictable as there are no outward suggestions that one external electron donor will work better than another with a particular procatalyst. As demonstrated by the present disclosure, the present catalyst compositions with an external electron donor comprising a phosphite, and/or a phosphonite, and/or a pyrophosphite, and/or a diphosphazane demonstrate high stereoregularity, high activity, and improved hydrogen response resulting in format olefin-based polymers (propylene-based polymers in particular) with high isotacticity and high melt flow.

DEFINITIONS

All references to the Periodic Table of the Elements herein shall refer to the Periodic Table of the Elements, published and copyrighted by CRC Press, Inc., 2003. Also, any references to a Group or Groups shall be to the Groups or Groups reflected in this Periodic Table of the Elements using the IUPAC system for numbering groups. Unless stated to the contrary, implicit from the context, or customary in the art, all parts and percents are based on weight. For purposes of United States patent practice, the contents of any patent, patent application, or publication referenced herein are hereby incorporated by reference in their entirety (or the equivalent US version thereof is so incorporated by reference), especially with respect to the disclosure of synthetic techniques, definitions (to the extent not inconsistent with any definitions provided herein) and general knowledge in the art.

The term "comprising," and derivatives thereof, is not intended to exclude the presence of any additional component, step or procedure, whether or not the same is disclosed herein. In order to avoid any doubt, all compositions claimed herein through use of the term "comprising" may include any additional additive, adjuvant, or compound whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

Any numerical range recited herein, includes all values from the lower value to the upper value, in increments of one unit, provided that there is a separation of at least 2 units between any lower value and any higher value. As an example, if it is stated that the amount of a component, or a value of a compositional or a physical property, such as, for example, amount of a blend component, softening temperature, melt index, etc., is between 1 and 100, it is intended that all individual values, such as, 1, 2, 3, etc., and all subranges, such as, 1 to 20, 55 to 70, 197 to 100, etc., are expressly enumerated in this specification. For values which are less than one, one unit is considered to be 0.0001, 0.001, 0.01 or 0.1, as appropriate. These are only examples of what is specifically intended, and all possible combinations of numerical values between the lowest value and the highest value enumerated, are to be considered to be expressly stated in this application. In other words, any numerical range recited herein includes any value or subrange within the stated range. Numerical ranges have been recited, as discussed herein, reference melt index, melt flow rate, and other properties.

The terms "blend" or "polymer blend," as used herein, is a blend of two or more polymers. Such a blend may or may not be miscible (not phase separated at molecular level). Such a blend may or may not be phase separated. Such a blend may or may not contain one or more domain configurations, as determined from transmission electron spectroscopy, light scattering, x-ray scattering, and other methods known in the art.

The term "composition," as used herein, includes a mixture of materials which comprise the composition, as well as reaction products and decomposition products formed from the materials of the composition.

The term "polymer" is a macromolecular compound prepared by polymerizing monomers of the same or different type. "Polymer" includes homopolymers, copolymers, terpolymers, interpolymers, and so on. The term "interpolymer" means a polymer prepared by the polymerization of at least two types of monomers or comonomers. It includes, but is not limited to, copolymers (which usually refers to polymers prepared from two different types of monomers or comonomers, terpolymers (which usually refers to polymers prepared from three different types of monomers or comonomers), tetrapolymers (which usually refers to polymers prepared from four different types of monomers or comonomers), and the like.

The term "interpolymer," as used herein, refers to polymers prepared by the polymerization of at least two different types of monomers. The generic term interpolymer thus includes copolymers, usually employed to refer to polymers prepared from two different monomers, and polymers prepared from more than two different types of monomers.

The term "olefin-based polymer" is a polymer containing, in polymerized form, a majority weight percent of an olefin, for example ethylene or propylene, based on the total weight of the polymer. Nonlimiting examples of olefin-based polymers include ethylene-based polymers and propylene-based polymers.

The term, "ethylene-based polymer," as used herein, refers to a polymer that comprises a majority weight percent polymerized ethylene monomer (based on the total weight of polymerizable monomers), and optionally may comprise at least one polymerized comonomer.

The term, "propylene-based polymer," as used herein, refers to a polymer that comprises a majority weight percent polymerized propylene monomer (based on the total amount of polymerizable monomers), and optionally may comprise at least one polymerized comonomer.

The term "alkyl," as used herein, refers to a branched or unbranched, saturated or unsaturated acyclic hydrocarbon radical. Nonlimiting examples of suitable alkyl radicals include, for example, methyl, ethyl, n-propyl, i-propyl, 2-propenyl (or allyl), vinyl, n-butyl, t-butyl, i-butyl (or 2-methylpropyl), etc. The alkyls have 1 and 20 carbon atoms.

The term "substituted alkyl," as used herein, refers to an alkyl as just described in which one or more hydrogen atom bound to any carbon of the alkyl is replaced by another group such as a halogen, aryl, substituted aryl, cycloalkyl, substituted cycloalkyl, heterocycloalkyl, substituted heterocycloalkyl, halogen, alkylhalo, hydroxy, amino, phosphido, alkoxy, amino, thio, nitro, and combinations thereof. Suitable substituted alkyls include, for example, benzyl, trifluoromethyl and the like.

The term "aryl," as used herein, refers to an aromatic substituent which may be a single aromatic ring or multiple aromatic rings which are fused together, linked covalently, or linked to a common group such as a methylene or ethylene moiety. The aromatic ring(s) may include phenyl, naphthyl, anthracenyl, and biphenyl, among others. The aryls have 1 and 20 carbon atoms.

The term "phosphonite" includes not only compounds with a phosphorus atom joined to two alkoxy groups plus a hydrocarbyl group, but also compounds and their tautomers in which the hydrocarbyl group is replaced with a halogen (forming a halophosphonite) or an amino group ($NR_2$, forming a phosphoramidite), or a hydroxyl (—OH) group.

Test Methods

Melt flow rate (MFR) is measured in accordance with ASTM D 1238-01 test method at 230° with a 2.16 kg weight for propylene-based polymers.

Melt index for the ethylene-based polymers is measured in accordance with ASTM D 1238-01 test method at 190° with a 2.16 kg weight for ethylene-based polymers.

Xylene Solubles (XS) is measured using a $^1$H NMR method as described in U.S. Pat. No. 5,539,309, the entire content of which is incorporated herein by reference.

Xylene solubles may also be measured by flow-injection polymer analysis (FIPA) using a Viscotek GPC max VE 2001 GPC solvent/sample module and TDA 302 triple detector array. A detailed description of the FIPA method is described in *Journal of Applied Polymer Science,* 2002, 85(10), 2178, and references therein.

Polydispersity Index (PDI) is measured by an AR-G2 rheometer which is a stress control dynamic spectrometer manufactured by TA Instruments using a method according to Zeichner G R, Patel P D (1981) "A comprehensive Study of Polypropylene Melt Rheology" Proc. of the 2$^{nd}$ World Congress of Chemical Eng., Montreal, Canada. An ETC oven is used to control the temperature at 180° C.±0.1° C. Plant nitrogen purged inside the oven to keep sample from degradation by oxygen and moisture. A pair of 25 mm in diameter cone and plate sample holder is used. Samples are compress molded into 50 mm×100 mm×2 mm plaque. Samples are cut into 19 mm square and loaded on the center of the bottom plate. The geometries of upper cone is (1) Cone angle: 5:42:20 (deg:min:sec); (2) Diameter: 25 mm; (3) Truncation gap: 149 micron. The geometry of the bottom plate is 25 mm cylinder.

Testing Procedure:

The cone & plate sample holder are heated in the ETC oven at 180° C. for 2 hours. Then the gap is zeroed under blanket of nitrogen gas.

Cone is raised to 2.5 mm and sample loaded unto the top of the bottom plate.

Start timing for 2 minutes.

The upper cone is immediately lowered to slightly rest on top of the sample by observing the normal force.

After two minutes the sample is squeezed down to 165 micron gap by lower the upper cone.

The normal force is observed when the normal force down to <0.05 Newton the excess sample is removed from the edge of the cone and plate sample holder by a spatula.

The upper cone is lowered again to the truncation gap which is 149 micron.

An Oscillatory Frequency Sweep test is performed under these conditions:
  i. Test delayed at 180° C. for 5 minutes.
  ii. Frequencies: 628.3 r/s to 0.1 r/s.
  iii. Data acquisition rate: 5 point/decade.
  iv. Strain: 10%

When the test is completed the crossover modulus (Gc) is detected by the Rheology Advantage Data Analysis program furnished by TA Instruments.

PDI=100,000÷Gc (in Pa units).

By way of example and not by limitation, examples of the present disclosure will now be provided.

1. External Electron Donor

Table 1 below provides the compounds used as external electron donors.

TABLE 1

| Compound | Abbreviation | Structure |
| --- | --- | --- |
| Dicyclopentyldimethoxysilane | DCPDMS (D-donor) | 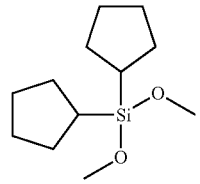 |
| n-Propyltrimethoxysilane | NPTMS (N-donor) | 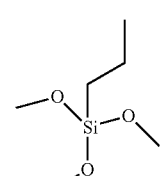 |
| Diethyl methyl phosphite | DEP-OMe | 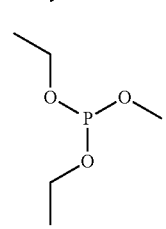 |
| Triethyl phosphite | TEP | 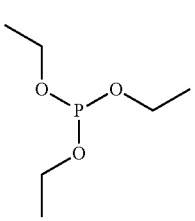 |

TABLE 1-continued

| Compound | Abbreviation | Structure |
|---|---|---|
| Diethyl propyl phosphite | DEP-OPr | |
| Diethyl (9-(methoxymethyl)-9H-fluoren-9-yl)methyl phosphite | DEP-Flu | |
| Diethyl methylphosphonite | DEP-Me | |
| Diethyl chlorophosphite (diethyl chlorophosphonite) (diethyl phosphorochloridite) | DEP-Cl | |
| Tetraethyl pyrophosphite (tetraethyl diphosphite) | TEPP | |
| Tetraethyl isopropyl diphosphazane (tetraethyl isopropyliminodiphosphite) | TEID | |

2. Preparation of External Electron Donors.

Phosphites that are not commercially available are prepared from phosphorous trichloride or diethyl chlorophosphite and the appropriate alcohol(s) according to the published methods: (a) *Organic Syntheses, Coll. Vol.* 4, p. 955 (1963); *Vol.* 31, p. 111 (1951) and/or (b) U.S. Patent Application Publication No. 2004/0106815. The alcohol (9-(methoxymethyl)-9H-fluoren-9-yl)methanol is prepared as described in U.S. Patent Application Publication Nos. 2004/0106814 and 2006/0142146. Diphosphazane compounds are prepared from diethyl chlorophosphite and the appropriate primary amine by analogy to the published methods: (c) *J. Chem. Soc.* 1964, 1543 and/or (d) *Polyhedron* 1993, 12(5), 533 and/or (e) *Tetrahedron: Asymmetry* 1995, 6(2) 427 and/or (f) *J. Am. Chem. Soc.* 2004, 126, 14712 and/or (g) *J. Organomet Chem.* 2005, 690, 742. Alternatively, diphosphazanes can be prepared from a $Cl_2PN(R)PCl_2$ (R=hydrocarbyl) intermediate and the appropriate alcohol(s) according to published methods: (h) *Inorg. Chem.* 1982, 21, 2139 and/or (i) *J. Organomet Chem.* 1990, 390, 203 and/or (j) *J. Organomet Chem.* 2007, 692, 1875.

3. Preparation of Catalyst Composition.

A slurry of SHAC™ 320 catalyst in mineral oil with 5.4 wt % solids content is prepared from a catalyst with a 2.68 wt % Ti content in the solid component. A slurry of the catalyst composition is prepared by premixing 0.20 g or 0.33 g of the 5.4% slurry (6.0 or 10.0 μmol Ti, respectively) with the appropriate molar amount of the external electron donor, and 5.4 mL (1.5 mmol) triethylaluminum (as a 0.28 M solution) for 20 minutes. The amount of external electron donor added is based on the molecular weight of the electron donor and ranges from 19-38 molar equivalents relative to Ti. All manipulations are performed in an inert atmosphere glovebox. After preparation, the catalyst slurry is loaded into a polymerization reactor injector from a septa-capped vial using an integrated needle, then injected into the reactor. Micromoles of Ti added, the molar ratio of external donor to Ti, and the polymerization results are contained in Tables (2-5).

4. Polymerization.

Polymerizations are conducted in a stirred, 3.8 L stainless steel autoclave. Temperature control is maintained by heating or cooling an integrated reactor jacket using circulated water. The top of the reactor is unbolted after each run so that the contents can be emptied after venting the volatiles. All chemicals used for polymerization or catalyst preparation are run through purification columns to remove impurities. Propylene and solvents are passed through two columns, the first column containing alumina, the second column containing a purifying reactant (Q5™ available from Engelhard Corporation). Nitrogen and hydrogen gases are passed through a single column containing Q5™ reactant.

After attaching the reactor head to the body, the reactor is purged with nitrogen while being heated to 140° C. and then while cooling to approximately 30° C. The reactor is then filled with a solution of diethylaluminum chloride in isooctane (1 wt %) and agitated for 15 minutes. This scavenging solution is then flushed to a recovery tank and the reactor is filled with ~1375 g of propylene. Hydrogen is added using a mass flow meter and the reactor is brought to 62° C. The amount of hydrogen added ranges from 1000-8000 SCC and is shown as $H_2/C_3$ molar ratio in Tables (2-5). The catalyst is injected as a slurry in oil or light hydrocarbon and the injector is flushed with isooctane three times to ensure complete delivery. After injection, the reactor temperature is ramped to 67° C. over 5 minutes, or maintained at 67° C. via cooling in the case of large exotherms. After a run time of 1 hour, the reactor is cooled to ambient temperature, vented, the head is removed, and the contents are emptied. Polymer weights are measured after drying overnight or to constant weight in a ventilated fume hood.

Catalyst properties, process performance and resultant polymer properties for catalysts containing the external electron donors of Table 1 are provided in Tables (2-5).

TABLE 2

Phosphite and Diphosphazane Polymerizations (0.41 mol % $H_2/C_3$)

| Run # | μmol Ti | External Electron Donor | EED:Ti ratio | Yield PP (g) | Eff (kg/g cat) | XS by FIPA (%) | XS by NMR (%) | Melt flow (g/10 min) | PDI |
|---|---|---|---|---|---|---|---|---|---|
| 2-1a* | 6.0 | DCPDMS | 25 | 453 | 42.0 | 2.8 | 2.4 | 7.2 | — |
| 2-1b* | 6.0 | DCPDMS | 25 | 347 | 32.2 | 2.9 | 2.7 | 4.6 | 4.78 |
| 2-1c* | 6.0 | DCPDMS | 25 | 515 | 47.7 | 3.0 | 2.9 | 7.1 | — |
| 2-1d* | 6.0 | DCPDMS | 25 | 337 | 31.2 | 3.0 | 2.6 | 3.9 | 4.88 |
| 2-1e* | 6.0 | DCPDMS | 25 | 487 | 45.1 | 2.8 | 2.7 | 8.2 | — |
| 2-1f* | 6.0 | DCPDMS | 25 | 368 | 34.1 | 2.5 | 2.8 | 8.9 | 5.14 |
| 2-1g* | 6.0 | DCPDMS | 25 | 478 | 44.3 | 2.6 | 2.5 | 7.6 | — |
| 2-1h* | 6.0 | DCPDMS | 25 | 385 | 35.7 | 2.7 | 2.5 | 6.8 | 4.84 |
| 2-2 | 6.0 | DEP-OMe | 19 | 374 | 34.7 | 4.5 | — | 261.3 | hmf |
| 2-3 | 6.0 | DEP-OMe | 25 | 402 | 37.3 | 4.2 | — | 174.5 | hmf |
| 2-4 | 6.0 | DEP-OMe | 31 | 427 | 39.6 | 4.5 | — | 239.0 | hmf |
| 2-5 | 6.0 | DEP-OMe | 38 | 335 | 31.0 | 4.1 | — | 240.3 | hmf |
| 2-6 | 6.0 | TEP | 19 | 289 | 26.8 | 4.0 | — | 235.9 | hmf |
| 2-7 | 6.0 | TEP | 25 | 289 | 26.8 | 3.9 | — | 177.3 | hmf |
| 2-8 | 6.0 | TEP | 31 | 333 | 30.9 | 3.6 | — | 301.4 | hmf |
| 2-9 | 6.0 | TEP | 38 | 314 | 29.1 | 3.6 | — | 301.4 | hmf |
| 2-10 | 6.0 | DEP-OPr | 19 | 331 | 30.7 | 4.4 | — | 403.2 | hmf |
| 2-11 | 6.0 | DEP-OPr | 25 | 354 | 32.8 | 4.6 | — | 416.2 | hmf |
| 2-12 | 6.0 | DEP-OPr | 31 | 319 | 29.6 | 4.6 | — | 417.2 | hmf |
| 2-13 | 6.0 | DEP-OPr | 38 | 319 | 29.6 | 4.0 | — | 440.5 | hmf |
| 2-14 | 6.0 | TEID | 19 | 193 | 17.9 | 4.9 | — | 87.1 | hmf |
| 2-15 | 6.0 | TEID | 25 | 171 | 15.8 | 4.6 | — | 81.5 | 4.51 |
| 2-16 | 6.0 | TEID | 31 | 182 | 16.9 | 4.7 | — | 92.1 | hmf |
| 2-17 | 6.0 | TEID | 38 | 177 | 16.4 | 4.4 | — | 109.8 | hmf |

*= comparative, not an example of the disclosure
EED = external electron donor
PP = propylene-based polymer produced (g)
Eff = efficiency as determined by propylene-based polymer produced (kg)/catalyst composition (g)/hr
"—" = not determined
hmf = "high melt flow" which renders a PDI measurement by rheology which must be extrapolated

TABLE 3

Phosphite, Pyrophosphite, and Diphosphazane Polymerizations (0.14 mol % $H_2/C_3$)

| Run # | µmol Ti | External Electron Donor | EED:Ti ratio | Yield PP (g) | Eff (kg/g cat) | XS by FIPA (%) | XS by NMR (%) | Melt flow (g/10 min) | PDI |
|---|---|---|---|---|---|---|---|---|---|
| 3-1a* | 10.0 | NPTMS | 25 | 365 | 20.7 | — | 2.1 | 3.6 | 3.88 |
| 3-1b* | 10.0 | NPTMS | 25 | 318 | 18.0 | — | 1.9 | 3.2 | 3.80 |
| 3-2 | 6.0 | DEP-OMe | 25 | 341 | 31.6 | 4.8 | — | 74.0 | hmf |
| 3-3a | 10.0 | TEP | 25 | 445 | 25.2 | 3.9 | — | 55.1 | 3.83 |
| 3-3b | 6.0 | TEP | 25 | 296 | 27.4 | 4.4 | — | 62.1 | — |
| 3-4 | 6.0 | DEP-OPr | 25 | 269 | 24.9 | 5.2 | — | 83.8 | hmf |
| 3-5 | 6.0 | DEP-Flu | 25 | 236 | 21.9 | 4.8 | — | 51.0 | 4.40 |
| 3-6a | 10.0 | TEPP | 25 | 239 | 13.5 | 6.1 | — | 45.1 | 4.28 |
| 3-6b | 10.0 | TEPP | 25 | 249 | 14.1 | 6.0 | — | 29.1 | 4.39 |
| 3-7 | 6.0 | TEID | 25 | 127 | 11.8 | 4.9 | — | 26.4 | 4.96 |

\* = comparative, not an example of the disclosure
EED = external electron donor
PP = propylene-based polymer produced (g)
Eff = efficiency as determined by propylene-based polymer produced (kg)/catalyst composition (g)/hr
"—" = not determined
hmf = polymer is "high melt flow" and yields a PDI measurement by rheology which must be extrapolated

TABLE 4

Phosphite, Pyrophosphite, and Diphosphazane Polymerizations (1.09 mol % $H_2/C_3$)

| Run # | µmol Ti | External Electron Donor | EED:Ti ratio | Yield PP (g) | Eff (kg/g cat) | XS by FIPA (%) | XS by NMR (%) | Melt flow (g/10 min) | PDI |
|---|---|---|---|---|---|---|---|---|---|
| 4-1a* | 10.0 | NPTMS | 25 | 363 | 20.6 | — | 1.9 | 105.6 | 4.33 |
| 4-1b* | 10.0 | NPTMS | 25 | 370 | 21.0 | — | 1.7 | 87.1 | 4.37 |
| 4-2 | 6.0 | DEP-OMe | 25 | 395 | 36.6 | 4.9 | — | 824.9 | hmf |
| 4-3a | 10.0 | TEP | 25 | 697 | 39.5 | 3.8 | — | 890.4 | hmf |
| 4-3b | 6.0 | TEP | 25 | 481 | 44.6 | 4.4 | — | 905.5 | hmf |
| 4-4 | 6.0 | DEP-OPr | 25 | 375 | 34.8 | 4.1 | — | 1581.3 | hmf |
| 4-5 | 6.0 | DEP-Flu | 25 | 232 | 21.5 | 4.6 | — | 705.6 | hmf |
| 4-6a | 10.0 | TEPP | 25 | 198 | 11.2 | 5.9 | — | 612.6 | hmf |
| 4-6b | 10.0 | TEPP | 25 | 314 | 17.8 | 4.9 | — | 489.9 | hmf |
| 4-7 | 6.0 | TEID | 25 | 201 | 18.6 | 4.4 | — | 253.6 | hmf |

\* = comparative, not an example of the disclosure
EED = external electron donor
PP = propylene-based polymer produced (g)
Eff = efficiency as determined by propylene-based polymer produced (kg)/catalyst composition (g)/hr
"—" = not determined
hmf = polymer is "high melt flow" and yields a PDI measurement by rheology which must be extrapolated

TABLE 5

Phosphonite Polymerizations (1.09 mol % $H_2/C_3$)

| Run # | µmol Ti | External Electron Donor | EED:Ti ratio | Yield PP (g) | Eff (kg/g cat) | XS by FIPA (%) | XS by NMR (%) | Melt flow (g/10 min) | PDI |
|---|---|---|---|---|---|---|---|---|---|
| 5-1a* | 10.0 | NPTMS | 25 | 363 | 20.6 | — | 1.9 | 105.6 | 4.33 |
| 5-1b* | 10.0 | NPTMS | 25 | 370 | 21.0 | — | 1.7 | 87.1 | 4.37 |
| 5-2 | 6.0 | DEP-Me | 25 | 269 | 24.9 | 7.2 | — | 946.0 | hmf |
| 5-3 | 10.0 | DEP-Cl | 25 | 514 | 29.1 | 6.4 | — | 726.6 | hmf |

\* = comparative, not an example of the disclosure
EED = external electron donor
PP = propylene-based polymer produced (g)
Eff = efficiency as determined by propylene-based polymer produced (kg)/catalyst composition (g)/hr
"—" = not determined
hmf = "high melt flow" which renders a PDI measurement by rheology which must be extrapolated It is specifically intended that the present disclosure not be limited to the embodiments and illustrations contained herein, but include modified forms of those embodiments including portions of the embodiments and combinations of elements of different embodiments as come within the scope of the following claims.

The invention claimed is:

1. A catalyst composition comprising:
a procatalyst composition comprising a magnesium moiety;
a cocatalyst; and a phosphorus-based external electron donor having the structure (IX)

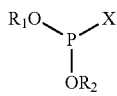

wherein $R_1$ and $R_2$ are the same or different and each of $R_1$-$R_2$ is selected from the group consisting of a substituted hydrocarbyl group having 1 to 20 carbon atoms, an unsubstituted hydrocarbyl group having 1 to 20 carbon atoms, and combinations thereof; and X is an amino group selected from the group consisting of —$NH_2$, —$NHR_3$, and —$NR_3R_4$, wherein $R_3$ and $R_4$ are the same or different and each of $R_3$ and $R_4$ is selected from the group consisting of a substituted hydrocarbyl group having 1 to 20 carbon atoms and an unsubstituted hydrocarbonyl group having 1 to 20 carbon atoms.

2. The catalyst composition of claim 1 wherein the procatalyst composition comprises a component selected from the group consisting of a titanium moiety, an internal electron donor, and combinations thereof.

3. The catalyst composition of claim 2 wherein the procatalyst composition comprises an internal electron donor selected from the group consisting of an aromatic acid ester, a diether, a silyl ester, and combinations thereof.

4. The catalyst composition of claim 3 wherein the internal electron donor is an aromatic acid ester.

5. The catalyst composition of claim 1 wherein $R_1$ and $R_2$ form a P-ring structure.

6. The catalyst composition of claim 1 wherein $R_1$ and X form a first P-ring structure and $R_2$ and X form a second P-ring structure.

7. The catalyst composition of claim 1 wherein at least one of $R_3$ and $R_4$ is a substituted hydrocarbyl group comprising one or more heteroatoms.

8. The catalyst composition of claim 1 wherein $R_3$ and $R_4$ are joined together to form a ring structure.

9. The catalyst composition of claim 1 wherein $R_3$ forms a ring structure with $R_1$.

10. The catalyst composition of claim 9 wherein $R_4$ forms a ring structure with $R_2$.

11. The catalyst composition of claim 1 wherein structure (IX) is a phosphoramidite.

12. The catalyst composition of claim 1 wherein structure (IX) has the structure

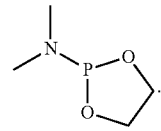

13. The catalyst composition of claim 1 wherein structure (IX) has the structure

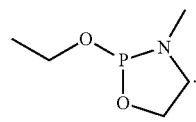

14. The catalyst composition of claim 1 wherein the external electron donor further comprises a member selected from the group consisting of a phosphite, an alkoxysilane, an activity limiting agent, and combinations thereof.

15. The catalyst composition of claim 1 wherein X is —$NR_3R_4$.

16. The catalyst composition of claim 1 wherein X is —$NR_3R_4$ and each of $R_3$ and $R_4$ is an unsubstituted hydrocarbonyl group having 1 to 20 carbon atoms.

* * * * *